US010380750B2

(12) United States Patent
Lu et al.

(10) Patent No.: US 10,380,750 B2
(45) Date of Patent: Aug. 13, 2019

(54) IMAGE DEPTH CALCULATING DEVICE AND METHOD

(71) Applicant: HON HAI PRECISION INDUSTRY CO., LTD., New Taipei (TW)

(72) Inventors: Chih-Te Lu, New Taipei (TW); Tung-Tso Tsai, New Taipei (TW); Jung-Hao Yang, New Taipei (TW); Chih-Yuan Chuang, New Taipei (TW); Chin-Pin Kuo, New Taipei (TW); Tsung-Yuan Tu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 152 days.

(21) Appl. No.: 15/667,403

(22) Filed: Aug. 2, 2017

(65) Prior Publication Data

US 2019/0019301 A1    Jan. 17, 2019

(51) Int. Cl.
*G06T 7/50* (2017.01)
*G01B 11/22* (2006.01)
*H04N 13/128* (2018.01)

(52) U.S. Cl.
CPC .............. *G06T 7/50* (2017.01); *G01B 11/22* (2013.01); *H04N 13/128* (2018.05); *G06T 2207/10016* (2013.01)

(58) Field of Classification Search
CPC combination set(s) only.
See application file for complete search history.

(56) References Cited

U.S. PATENT DOCUMENTS

| 8,837,932 | B2 * | 9/2014 | Lee | H04N 5/23212 |
| | | | | 396/125 |
| 8,872,902 | B2 * | 10/2014 | Hyodo | H04N 13/183 |
| | | | | 348/54 |
| 8,908,012 | B2 * | 12/2014 | Hsu | G06T 7/564 |
| | | | | 348/46 |
| 8,983,176 | B2 * | 3/2015 | Kelley | G06T 11/60 |
| | | | | 382/154 |
| 2010/0188584 | A1 * | 7/2010 | Liu | G06T 7/50 |
| | | | | 348/699 |

(Continued)

FOREIGN PATENT DOCUMENTS

CN 103237214 A 8/2013
TW 201241547 A 10/2012

*Primary Examiner* — Tsung Yin Tsai
(74) *Attorney, Agent, or Firm* — ScienBiziP, P.C.

(57) ABSTRACT

An image depth calculating device, which can calculate depth information of a binocular video with reduced computation, includes multiple modules. Modules receives a first frame information set that corresponds to a first frame time of the binocular video and establishes a first rhombic area that centers on a first pixel in a first viewing angle frame, to calculate a total pixel value of the first rhombic area. Modules further establishes a plurality of second rhombic areas that center on a plurality of second pixels of a pixel area in a second viewing angle frame to calculate a second total pixel value of each of the plurality of second rhombic areas. A depth calculating module compares the first total pixel value with each second total pixel value and calculates first frame depth information according to the result. An image depth calculating method is also provided.

20 Claims, 6 Drawing Sheets

(56) References Cited

U.S. PATENT DOCUMENTS

| | | | |
|---|---|---|---|
| 2011/0091113 A1* | 4/2011 | Ito | G06K 9/00248 |
| | | | 382/197 |
| 2011/0129144 A1* | 6/2011 | Takahashi | G06T 5/008 |
| | | | 382/154 |
| 2011/0304618 A1* | 12/2011 | Chen | H04N 13/128 |
| | | | 345/420 |
| 2012/0057776 A1* | 3/2012 | Tao | G06T 7/536 |
| | | | 382/154 |
| 2012/0293627 A1* | 11/2012 | Ishii | G06T 3/4007 |
| | | | 348/46 |
| 2013/0071012 A1* | 3/2013 | Leichsenring | G06K 9/80 |
| | | | 382/154 |
| 2017/0148199 A1* | 5/2017 | Holzer | G06T 7/337 |

* cited by examiner

IMAGE DEPTH CALCULATING DEVICE AND METHOD

FIELD

The subject matter herein generally relates to image depth calculating device and method.

BACKGROUND

Stereo matching is important in the computer vision field. A computation burden of a current stereo matching algorithm is heavy, costing much calculating time.

BRIEF DESCRIPTION OF THE DRAWINGS

Implementations of the present technology will now be described, by way of example only, with reference to the attached figures.

DETAILED DESCRIPTION

Figure 1:
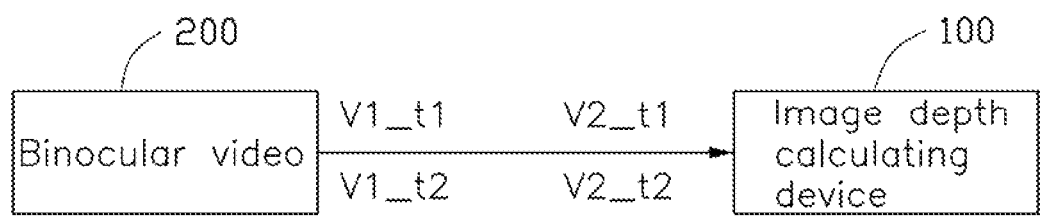
FIG. 1 is a diagram of an exemplary embodiment of an image depth calculating device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates an image depth calculating device 100 in accordance with an exemplary embodiment.

The image depth calculating device 100 is configured to calculate depth information of a binocular video 200. The binocular video 200 can comprise a plurality of frame information sets. Each frame information set corresponds to a frame time, and each frame information set comprises two viewing angles of the frame information.

For example, a first frame information set corresponds to a first frame time t1 of the binocular video 200 and a second frame information set corresponds to a second frame time t2 of the binocular video 200. The first frame information set comprises first view angle frame information V1_t1 and second view angle frame information V2_t1. The second frame information set comprises first view angle frame information V1_t2 and second view angle frame information V2_t2. The first view angle frame information V1_t1 and V1_t2 can be left eye/left camera view frame information. The second view angle frame information V2_t1 and V2_t2 can be right eye/right camera view frame information.

In one exemplary embodiment, the first frame time t1 and the second frame time t2 are close together. A time difference between the first frame time t1 and the second frame time t2 is less than two seconds for example.

Figure 2:
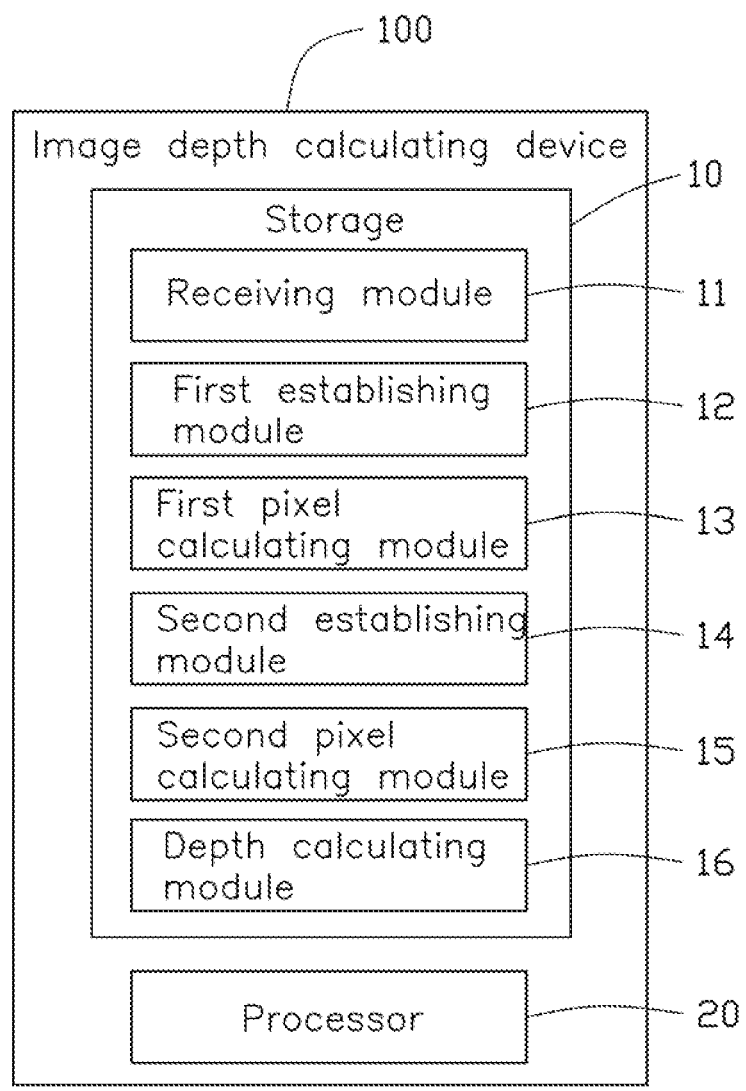
FIG. 2 is a block diagram of an exemplary embodiment of the image depth calculating device of FIG. 1.

Referring to FIG. 2, the image depth calculating device 100 can comprise at least one storage 10 and at least one processor 20. The image depth calculating device 100 can further comprise a plurality of modules, such as a receiving module 11, a first establishing module 12, a first pixel calculating module 13, a second establishing module 14, a second pixel calculating module 15, and a depth calculating module 16. The modules 11-16 can comprise one or more software programs in the form of computerized codes stored in the storage 3. The computerized codes can include instructions that can be executed by the processor 2 to provide functions for the modules 11-16.

The receiving module 11 receives the first frame information set. The first frame information set comprises the first view angle frame information V1_t1 (frame information of a first view angle frame I1_t1) and the second view angle frame information V1_t2 (frame information of a second view angle frame I1_t1). The first view angle frame I1_t1 and the second view angle frame I1_t1 both comprise a plurality of pixels. Each of the plurality of pixels can be defined as an XY coordinate.

In one exemplary embodiment, the first view angle frame I1_t1 and the second view angle frame I1_t1 can be defined in the same coordinate system. A pixel in the left bottom of the first view angle frame I1_t1 and the second view angle frame I1_t1 can be a coordinate origin O1. The first view angle frame information V1_t1 can comprise coordinate information of each pixel of the first view angle frame I1_t1. The second view angle frame information V2_t1 can comprise coordinate information of each pixel of the second view angle frame I2_t1.

In one exemplary embodiment, when the binocular video 200 is transmitted in a compressed-data video, the receiving module 11 can comprise a video decompressing tool to decompress the binocular video 200.

Figure 3A:
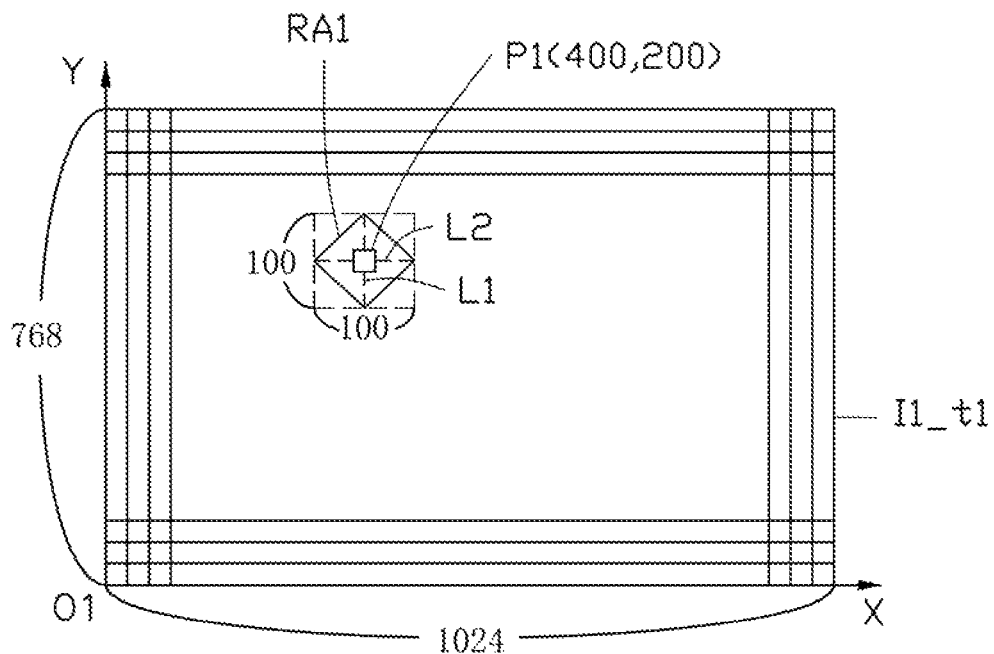
FIG. 3A is a diagram of an exemplary embodiment of a first rhombic area established by a first establishing module of the image depth calculating device of FIG. 1.

Referring to FIG. 3A, the first establishing module 12 establishes a first rhombic area RA1 that centers on a first pixel P1 of the first view angle frame I1_t1.

In one exemplary embodiment, the coordinate of the first pixel P1 is (400, 200) and the resolutions of the first view angle frame I1_t1 and the second view angle frame I2_t1 are 1024*768 for example. The first rhombic area RA1 comprises a first diagonal L1 and a second diagonal L2, a first diagonal length being equal to a second diagonal length.

In one exemplary embodiment, the first pixel P1 is a center point of the first rhombic area RA1, and the first diagonal length is the length of one hundred pixels for example. Then, the first rhombic area RA1 comprises five thousand pixels (i.e., 100*100/2). When the first establishing module 12 establishes a square area that centers on the first pixel P1 of the first view angle frame I1_t1 (a side length is one hundred pixels long), the square area comprises ten thousand pixels.

The first pixel calculating module 13 calculates a total pixel value of the first rhombic area RA1. When the first rhombic area RA1 comprises five thousand pixels, the first pixel calculating module 13 can calculate the total pixel value of the five thousand pixels through an additive operation.

Figure 3B:
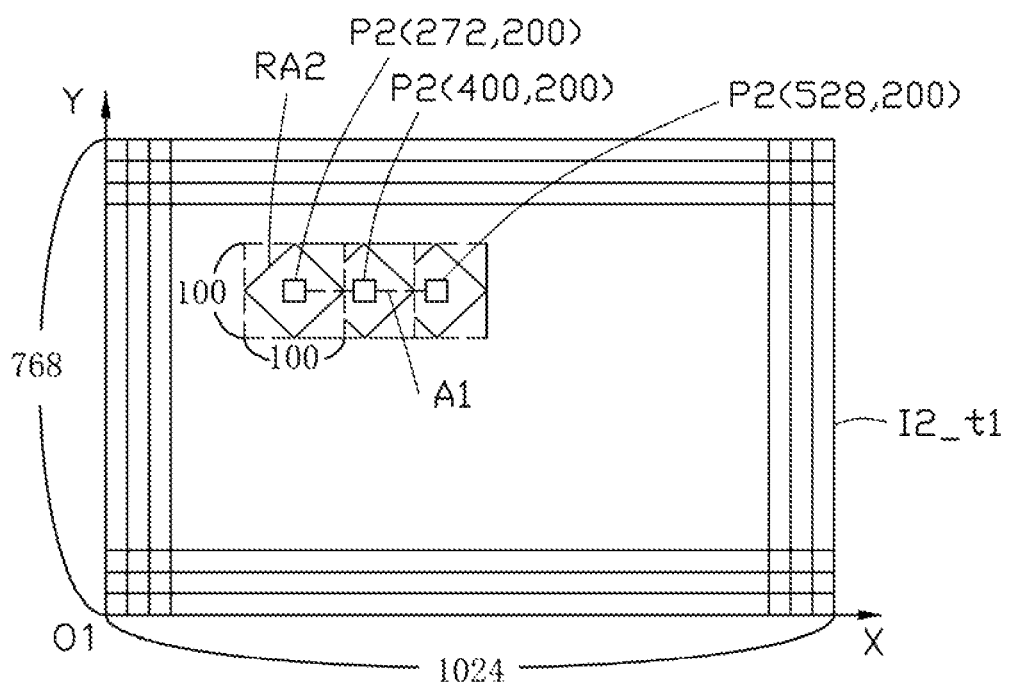
FIG. 3B is a diagram of an exemplary embodiment of a plurality of second rhombic areas established by a second establishing module of the image depth calculating device of FIG. 1.

Referring to FIG. 3B, the second establishing module 14 establishes a pixel area A1 in the second view angle frame I2_t1 according to a predetermined depth level of the binocular video 200 and the first pixel P1. The pixel area A1 comprises a plurality of second pixels P2. The second establishing module 14 further establishes a plurality of second rhombic areas PA2 that center on each second pixel P2 of the pixel area A1.

For example, the predetermined depth level of the binocular video 200 is 256. The pixel area A1 comprises 256 second pixels P2. The second view angle frame I2_t1 also comprises a second pixel P2 that has a coordinate of the second pixel P2 (400, 200). A horizontal coordinate of a first pixel of the pixel area A1 is 272 (i.e., 400−256/2) and a horizontal coordinate of a last pixel of the pixel area A1 is 528 (i.e., 400+256/2). Then, coordinates of the plurality of second pixels P2 are (272, 200), (273, 200), (274, 200), . . . (527, 200), and (528, 200). The second establishing module 14 establishes 256 second rhombic areas PA2 according to 256 second pixels P2.

In one exemplary embodiment, the first rhombic area PA1 and each of the second rhombic areas PA2 have the same size and shape. Then, each of the second rhombic areas PA2 comprises five thousand pixels. Each of the second pixels P2 is a center point of each of the corresponding second rhombic areas PA2.

The second pixel calculating module 15 calculates a total pixel value of each of the second rhombic areas PA2. The second pixel calculating module 15 can calculate the total pixel value of each of the second rhombic areas PA2 through an additive operation. After calculating the total pixel value of each of the second rhombic areas PA2, the second pixel calculating module 15 can obtain 256 sets in total pixel value.

In one exemplary embodiment, the first pixel calculating module 13 defines a first sequence number to each pixel of the first rhombic area PA1. The first pixel calculating module 13 calculates the total pixel value of the even numbered pixels of the first rhombic area. The second pixel calculating module 15 defines a second sequence number to each pixel of each second rhombic area PA2. The second pixel calculating module 15 calculates the total pixel value of the even numbered pixels of each second rhombic area PA2. Then, the first pixel calculating module 13 and the second pixel calculating module 15 only need to calculate the total pixel value of two thousand five hundred pixels.

In one exemplary embodiment, the first pixel calculating module 13 can calculate the total pixel value of the odd numbered pixels of the first rhombic area PA1. The second pixel calculating module 15 can calculate the total pixel value of the odd numbered pixels of each second rhombic area PA2.

The depth calculating module 16 compares the total pixel value of the first rhombic area PA1 with the total pixel value of each second rhombic area PA2, and calculates first frame depth information according to a result of the comparison.

Figure 4:
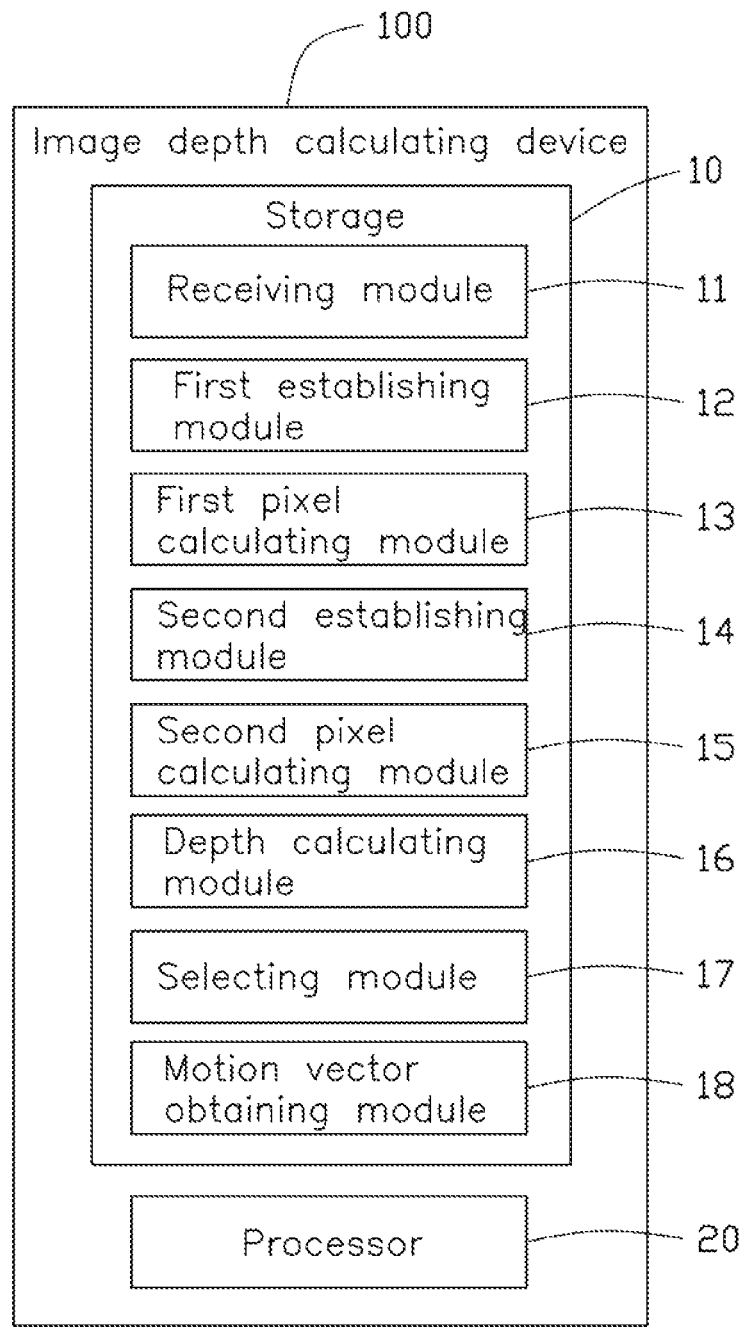
FIG. 4 is a block diagram of another exemplary embodiment of an image depth calculating device.

The image depth calculating device 100, in addition to modules 11-16, may further comprise a selecting module 17 as shown in FIG. 4. The depth calculating module 16 can compare the total pixel value of the first rhombic area PA1 with 256 sets in total pixel value (corresponding to 256 sets rhombic area PA2).

In one exemplary embodiment, the depth calculating module 16 calculates difference values between the total pixel value of the first rhombic area PA1 and the total pixel value of each second rhombic area PA2. The selecting module 17 selects a special second rhombic area from the plurality of second rhombic areas PA2, which has a minimum difference value with respect to the first rhombic area PA1. The depth calculating module 16 calculates the first frame depth information according to a second pixel coordinate of the special second rhombic area and the predetermined depth level.

For example, when the special second rhombic area is established by the second pixel P2 that is a coordinate of the second pixel P2 (315, 200). Then, first pixel depth information is equal to forty-three (i.e., 315-272) pixels length. The depth calculating module 16 can calculate other pixel depth information in similar way. The depth calculating module 16 can obtain the first frame depth information after calculating all pixel depth information of the first view angle frame I1_t1 or the second view angle frame I2_t1.

In one exemplary embodiment, the image depth calculating device 100, in addition to modules 11-17, may further comprises a motion vector obtaining module 18 as shown in FIG. 4. The receiving module 11 further receives the second frame information set. The motion vector obtaining module 18 obtains motion vector information of the second frame information set with respect to the first frame information set. Because of the closeness in time of first frame time t1 and the second frame time t2, the depth calculating module 16 can further calculate second frame depth information according to the first frame depth information and the motion vector information.

In one exemplary embodiment, the motion vector obtaining module 18 obtains the motion vector information of the second frame information set with respect to the first frame information set through a mean filtering algorithm.

Figure 5:
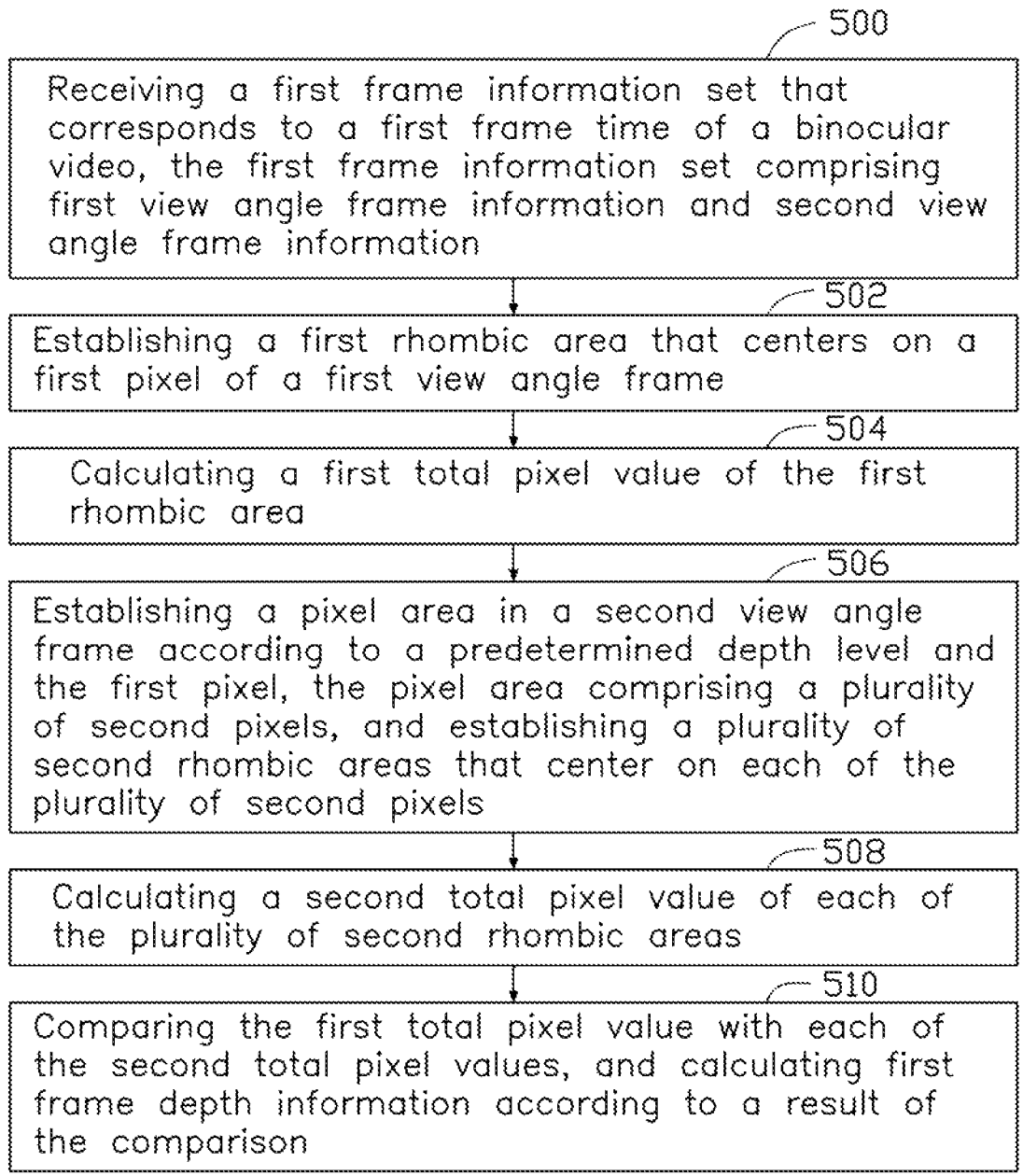
FIG. 5 is a flow diagram of an exemplary embodiment of an image depth calculating method applied in the image depth calculating device of FIG. 1 or FIG. 4.

FIG. 5 illustrates one exemplary embodiment of an image depth calculating method. The flowchart presents an exemplary embodiment of the method. The exemplary method is provided by way of example, as there are a variety of ways to carry out the method. The method described below can be carried out using the configurations illustrated in FIG. 2 or FIG. 4, for example, and various elements of these figures are referenced in explaining the example method. Each step shown in FIG. 5 may represent one or more processes, methods, or subroutines, carried out in the example method. Furthermore, the illustrated order of steps is illustrative only and the order of the steps can change. Additional steps can be added or fewer steps may be utilized, without departing from this disclosure. The example method can begin at step 500.

In step 500, the receiving module 11 receives a first frame information set that corresponds to a first frame time of the binocular video 200, and the first frame information set comprises first view angle frame information and second view angle frame information.

In step 502, the first establishing module 12 establishes the first rhombic area RA1 that centers on the first pixel P1 of the first view angle frame I1_t1.

In step 504, the first pixel calculating module 13 calculates a total pixel value of the first rhombic area RA1.

In step 506, the second establishing module 14 establishes the pixel area A1 in the second view angle frame I2_t1 according to a predetermined depth level of the binocular video 200 and the first pixel P1. The pixel area A1 comprises a plurality of second pixels P2. The second establishing module 14 further establishes a plurality of second rhombic areas PA2 that center on each second pixel P2 of the pixel area A1.

In step 508, the second pixel calculating module 15 calculates a total pixel value of each of the second rhombic areas PA2.

In step 510, the depth calculating module 16 compares the total pixel value of the first rhombic area PA1 with the total pixel value of each second rhombic area PA2 and calculates first frame depth information according to a result of the comparison.

In one exemplary embodiment, the first rhombic area PA1 and each of the second rhombic areas PA2 have the same size and shape. The first pixel calculating module 13 defines a first sequence number for each pixel of the first rhombic area PA1. The first pixel calculating module 13 calculates the total pixel value of the even or odd numbered pixels of the first rhombic area. The second pixel calculating module 15 defines a second sequence number to each pixel of each second rhombic area PA2. The second pixel calculating module 15 calculates the total pixel value of the even or odd numbered pixels of each second rhombic area PA2.

Figure 6:
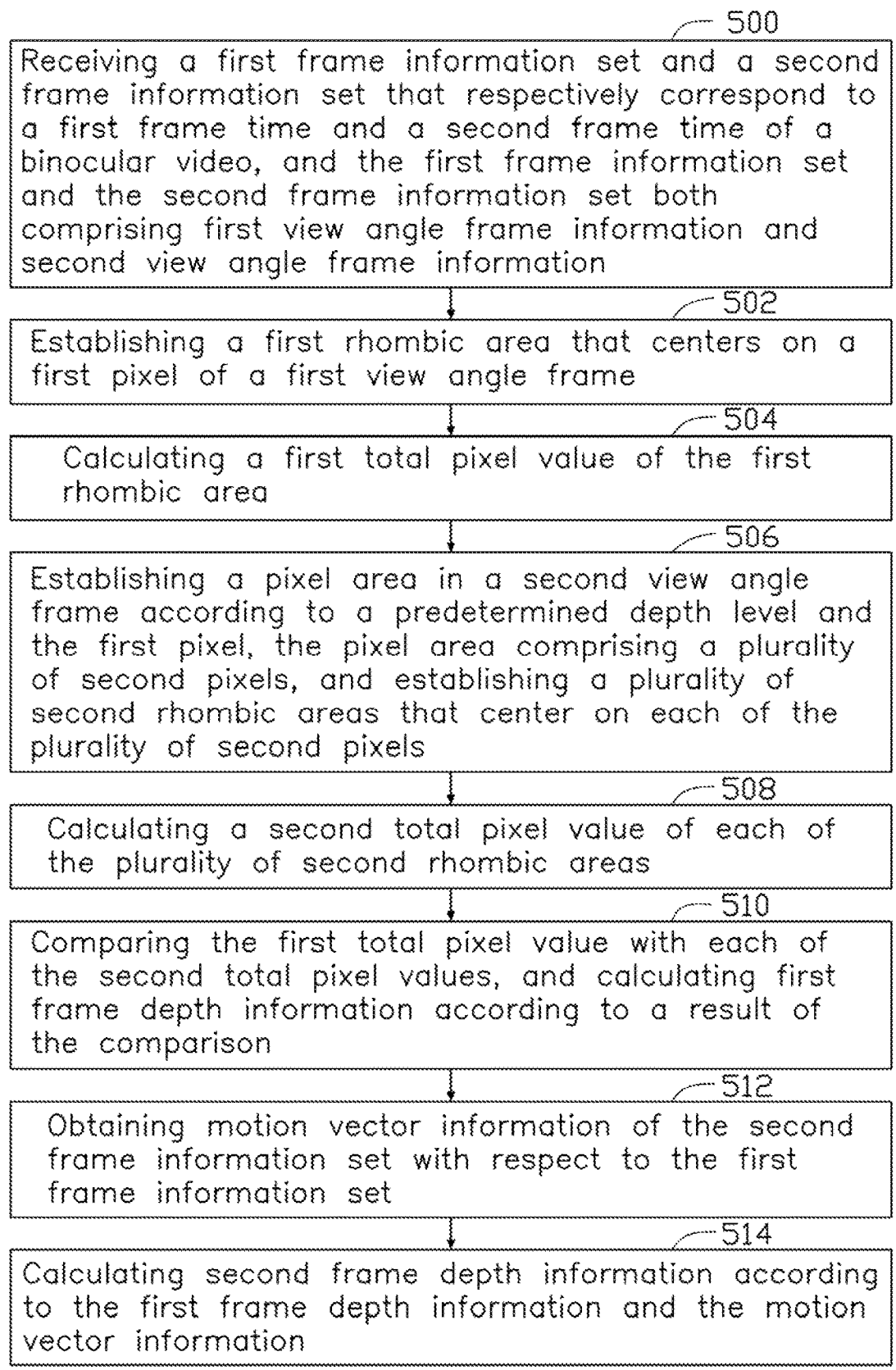
FIG. 6 is a flow diagram of another exemplary embodiment of an image depth calculating method.

Referring to FIG. 6, the image depth calculating method further comprises step 512 and step 514. In step 500, the receiving module 11 receives a first frame information set and a second frame information set that respectively correspond to a first frame time and a second frame time of the binocular video 200, and the first frame information set and the second frame information set both comprise first view angle frame information and second view angle frame information.

In step 512, the motion vector obtaining module 18 obtains motion vector information of the second frame information set with respect to the first frame information set.

In step 514, the depth calculating module 16 calculates second frame depth information according to the first frame depth information and the motion vector information.

In one exemplary embodiment, step 512 can be performed after step 510 or step 500.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. An image depth calculating method comprising:
    receiving a first frame information set that corresponds to a first frame time of a binocular video, the first frame information set comprising first view angle frame information and second view angle frame information;
    establishing a first rhombic area that centers on a first pixel of a first view angle frame;
    calculating a first total pixel value of the first rhombic area;
    establishing a pixel area in a second view angle frame according to a predetermined depth level and the first pixel, the pixel area comprising a plurality of second pixels, and establishing a plurality of second rhombic areas that center on each of the plurality of second pixels;
    calculating a second total pixel value of each of the plurality of second rhombic areas; and
    comparing the first total pixel value with each of the second total pixel values, and calculating first frame depth information according to a result of the comparison;
    wherein the first rhombic area and each of the second rhombic areas have the same size and shape.

2. The image depth calculating method of claim 1, further comprising:
    receiving a second frame information set that corresponds to a second frame time of the binocular video, and obtaining motion vector information of the second frame information set with respect to the first frame information set; and
    calculating second frame depth information according to the first frame depth information and the motion vector information.

3. The image depth calculating method of claim 2, wherein the step of obtaining the motion vector information of the second frame information set with respect to the first frame information set comprises:
    obtaining the motion vector information of the second frame information set with respect to the first frame information set through a mean filtering algorithm.

4. The image depth calculating method of claim 1, wherein the first pixel is a center point of the first rhombic area and the second pixel is a center point of the second rhombic area.

5. The image depth calculating method of claim 1, wherein the step of calculating the first total pixel value of the first rhombic area comprises:
    defining a sequence number for each pixel of the first rhombic area; and
    calculating the first total pixel value of even numbered pixels of the first rhombic area.

6. The image depth calculating method of claim 5, wherein the step of calculating the second total pixel value of each of the plurality of second rhombic areas comprises:
    defining a sequence number for each pixel of each second rhombic area; and
    calculating the second total pixel value of the even numbered pixels of each second rhombic area.

7. The image depth calculating method of claim 1, wherein the step of calculating the first total pixel value of the first rhombic area comprises:
    defining a sequence number for each pixel of the first rhombic area; and
    calculating the first total pixel value of odd numbered pixels of the first rhombic area.

8. The image depth calculating method of claim 7, wherein the step of the step of calculating the second total pixel value of each of the plurality of second rhombic areas comprises:
  defining a sequence number for each pixel of each second rhombic area; and
  calculating the second total pixel value of the odd numbered pixels of each second rhombic area.

9. The image depth calculating method of claim 1, wherein the first view angle frame and the second view angle frame are defined the same coordinate system, and each pixel of the first view angle frame and the second view angle frame is assigned a coordinate.

10. The image depth calculating method of claim 9, wherein the step of comparing the first total pixel value with each of the second total pixel values and calculating the first frame depth information according to the comparing result comprises:
  calculating difference values between the first total pixel value and each of the second total pixel values;
  selecting a special second rhombic area from the plurality of second rhombic areas, which has a minimum difference value with respect to the first rhombic area; and
  calculating the first frame depth information according to a second pixel coordinate of the special second rhombic area and the predetermined depth level.

11. An image depth calculating device comprising:
  at least one storage configured to store a plurality of modules, the plurality of modules being a collection of instructions of an application operable in the device;
  at least one processor configured to execute the plurality of modules, the modules comprising:
    a receiving module receiving a first frame information set that corresponds to a first frame time of a binocular video, the first frame information set comprising first view angle frame information and second view angle frame information;
    a first establishing module establishing a first rhombic area that centers on a first pixel of a first view angle frame;
    a first pixel calculating module calculating a first total pixel value of the first rhombic area;
    a second establishing module establishing a pixel area in a second view angle frame according to a predetermined depth level and the first pixel, and further establishing a plurality of second rhombic areas that center on each second pixel of the pixel area;
    a second pixel calculating module calculating a second total pixel value of each of the plurality of second rhombic areas; and
    a depth calculating module comparing the first total pixel value with each of the second total pixel values and calculating first frame depth information according to a result of the comparison;
    wherein the first rhombic area and each of the second rhombic areas have the same size and shape.

12. The image depth calculating device of claim 11, further comprising a motion vector obtaining module; wherein the receiving module further receives a second frame information set that corresponds to a second frame time of the binocular video; the motion vector obtaining module obtains motion vector information of the second frame information set with respect to the first frame information set; and the depth calculating module further calculates second frame depth information according to the first frame depth information and the motion vector information.

13. The image depth calculating device of claim 12, wherein the motion vector obtaining module obtains the motion vector information of the second frame information set with respect to the first frame information set through a mean filtering algorithm.

14. The image depth calculating device of claim 11, wherein the first pixel is a center point of the first rhombic area and the second pixel is a center point of the second rhombic area.

15. The image depth calculating device of claim 11, wherein the first pixel calculating module defines a sequence number for each pixel of the first rhombic area and calculates the first total pixel value of even numbered pixels of the first rhombic area.

16. The image depth calculating device of claim 15, wherein the second pixel calculating module defines a sequence number for each pixel of each second rhombic area and calculates the second total pixel value of the even numbered pixels of each second rhombic area.

17. The image depth calculating device of claim 11, wherein the first pixel calculating module defines a sequence number for each pixel of the first rhombic area and calculates the first total pixel value of odd numbered pixels of the first rhombic area.

18. The image depth calculating device of claim 17, wherein the second pixel calculating module defines a sequence number for each pixel of each second rhombic area and calculates the second total pixel value of the odd numbered pixels of each second rhombic area.

19. The image depth calculating device of claim 11, wherein the first view angle frame and the second view angle frame are defined the same coordinate system, and each pixel of the first view angle frame and the second view angle frame is assigned a coordinate.

20. The image depth calculating device of claim 19, further comprising a selecting module; wherein the depth calculating module calculates difference values between the first total pixel value and each of the second total pixel values; the selecting module selects a special second rhombic area from the plurality of second rhombic areas, which has a minimum difference value with respect to the first rhombic area; and the depth calculating module further calculates the first frame depth information according to a second pixel coordinate of the special second rhombic area and the predetermined depth level.

* * * * *